(12) United States Patent
Kunzman

(10) Patent No.: US 6,336,785 B1
(45) Date of Patent: Jan. 8, 2002

(54) QUICK COUPLER FOR HEAVY EQUIPMENT

(75) Inventor: Kevin Kunzman, Eastlake, OH (US)

(73) Assignee: Nippon Pneumatic Mfg. Co., Ltd., Osaka (JP)

( * ) Notice: Subject to any disclaimer, the term of this patent is extended or adjusted under 35 U.S.C. 154(b) by 0 days.

(21) Appl. No.: 09/419,509

(22) Filed: Oct. 18, 1999

Related U.S. Application Data

(63) Continuation of application No. 09/049,179, filed on Mar. 27, 1998, now abandoned.

(51) Int. Cl.$^7$ ................................................ E02F 3/28
(52) U.S. Cl. ........................ 414/723; 37/468; 403/321
(58) Field of Search ......................... 414/723; 37/468; 403/321, 326

(56) References Cited

U.S. PATENT DOCUMENTS

| | | | | |
|---|---|---|---|---|
| 2,963,183 A | * | 12/1960 | Przybylski | |
| 3,204,793 A | * | 9/1965 | Lane | |
| 3,231,116 A | * | 1/1966 | Powell | |
| 3,243,066 A | * | 3/1966 | Gardner | |
| 3,269,570 A | * | 8/1966 | Wallberg | |
| 3,512,665 A | * | 5/1970 | Westendorf | |
| 3,556,323 A | * | 1/1971 | Heimmermann | |
| 3,606,052 A | * | 9/1971 | Schurz | |
| 3,614,134 A | * | 10/1971 | Moriceau | |
| 3,672,521 A | * | 6/1972 | Bauer | |
| 3,705,656 A | * | 12/1972 | Hunger | |
| 3,718,222 A | * | 2/1973 | Foster | |
| 3,767,070 A | | 10/1973 | Arnold | |
| 3,794,195 A | | 2/1974 | Clevenger | |
| 3,802,731 A | | 4/1974 | LaBounty | |
| 3,818,551 A | | 6/1974 | Coughran, Jr. | |
| 3,829,128 A | | 8/1974 | Sutton | |
| 3,854,608 A | | 12/1974 | Arnold | |
| 3,876,091 A | | 4/1975 | MacDonald | |

(List continued on next page.)

OTHER PUBLICATIONS

European Search Report, dated Jul. 8, 1999.
Kiss Hitch, Inc. "Quick Coupler System" Product Advertisement.
NKP Model Q174 Instruction Manual.
Pictures of Hendrix Product Serial No. C1412.
Adjusta–Buckets "Quick Hitch Rigid Adapter" Product Advertisement.
Barone "Compact Wheel and One Minute Quick Coupler" Product Advertisement.
ACS Industries, Inc., "Quick Coupler Systems" Product Advertisement.

*Primary Examiner*—Donald W. Underwood
(74) *Attorney, Agent, or Firm*—Vickers, Daniels & Young

(57) ABSTRACT

A quick coupler for mounting implements on excavators has an upwardly facing set of recesses for engaging one mounting pin and a laterally facing set of recesses for engaging the other mounting pin on the implement. A freely rotatable latch closing the lateral recesses is provided with two locking mechanisms, both of which provide positive metal to metal lock.

40 Claims, 3 Drawing Sheets

U.S. PATENT DOCUMENTS

| | | |
|---|---|---|
| 3,883,015 A | 5/1975 | Gorby |
| 3,934,738 A | 1/1976 | Arnold |
| 3,952,431 A | 4/1976 | Gledhill et al. |
| 3,964,622 A | 6/1976 | Blair |
| 3,985,249 A | 10/1976 | Aker |
| 4,013,182 A | 3/1977 | Pratt |
| 4,017,114 A | 4/1977 | LaBounty |
| 4,030,624 A | 6/1977 | Matthews |
| 4,067,467 A | 1/1978 | Datta |
| 4,104,792 A | 8/1978 | LaBounty |
| 4,106,645 A | 8/1978 | Janish |
| 4,116,346 A | 9/1978 | Uchida |
| 4,116,347 A | 9/1978 | Uchida |
| 4,127,203 A | 11/1978 | Arnold |
| 4,176,727 A | 12/1979 | Perin |
| 4,179,225 A | 12/1979 | Asplund |
| 4,187,050 A | 2/1980 | Barbee |
| 4,203,238 A | 5/1980 | Bangert |
| 4,208,163 A | 6/1980 | Holmqvist |
| 4,214,840 A | 7/1980 | Beales |
| 4,225,283 A | 9/1980 | Baker |
| 4,243,356 A | 1/1981 | Takojima |
| 4,248,471 A | 2/1981 | LaBounty |
| 4,311,428 A | 1/1982 | Arnold |
| 4,345,872 A | 8/1982 | Arnold |
| 4,355,945 A | 10/1982 | Pilch |
| 4,376,340 A | 3/1983 | Ramun |
| 4,382,625 A | 5/1983 | LaBounty |
| 4,397,604 A | 8/1983 | McCain |
| 4,403,431 A | 9/1983 | Ramun |
| 4,413,945 A | 11/1983 | LaBounty |
| 4,417,844 A | 11/1983 | De Pingon |
| 4,436,477 A | 3/1984 | Lenertz |
| 4,452,560 A | 6/1984 | Coyle |
| 4,480,955 A | 11/1984 | Andrews |
| 4,549,744 A | 10/1985 | Herr et al. |
| 4,558,515 A | 12/1985 | LaBounty |
| 4,632,595 A | 12/1986 | Schaeff |
| 4,643,631 A | 2/1987 | Maurer |
| 4,670,983 A | 6/1987 | Ramun |
| 4,686,767 A | 8/1987 | Ramun |
| 4,703,968 A | 11/1987 | LaBounty |
| 4,708,579 A | 11/1987 | Baird |
| 4,726,731 A | 2/1988 | Jones |
| 4,771,540 A | 9/1988 | LaBounty |
| 4,810,162 A | 3/1989 | Foster |
| 4,824,319 A | 4/1989 | Arnold |
| 4,854,813 A | 8/1989 | Degeeter |
| 4,871,292 A | 10/1989 | Milanowski |
| 4,897,921 A | 2/1990 | Ramun |
| 4,907,356 A | 3/1990 | LaBounty |
| 4,929,143 A | 5/1990 | Dohnalik |
| 4,944,628 A | 7/1990 | Hulden |
| 4,963,071 A | 10/1990 | Larwin |
| 4,984,957 A | 1/1991 | Noguchi et al. |
| 4,986,722 A | 1/1991 | Kaczmarczyk et al. |
| 5,082,389 A | 1/1992 | Balemi |
| 5,107,610 A | 4/1992 | Fusco |
| 5,108,252 A | 4/1992 | Gilmore |
| 5,110,254 A | 5/1992 | Aubrey |
| 5,141,385 A | 8/1992 | Tibbatts |
| 5,147,173 A | 9/1992 | Fauber |
| 5,179,794 A | 1/1993 | Ballinger |
| 5,332,353 A | 7/1994 | Arnold |
| 5,456,030 A | 10/1995 | Barone |
| 5,597,283 A | 1/1997 | Jones |
| 5,607,251 A | 3/1997 | Rafn |
| 5,621,987 A | 4/1997 | Pratt |
| 5,634,735 A | 6/1997 | Horton |
| 5,634,736 A | 6/1997 | Brown |
| 5,642,785 A | 7/1997 | Dam-Rasmussen |
| 5,692,325 A | 12/1997 | Kuzutani |
| 5,692,852 A | 12/1997 | Collins |
| 5,692,855 A | 12/1997 | Burton |

\* cited by examiner

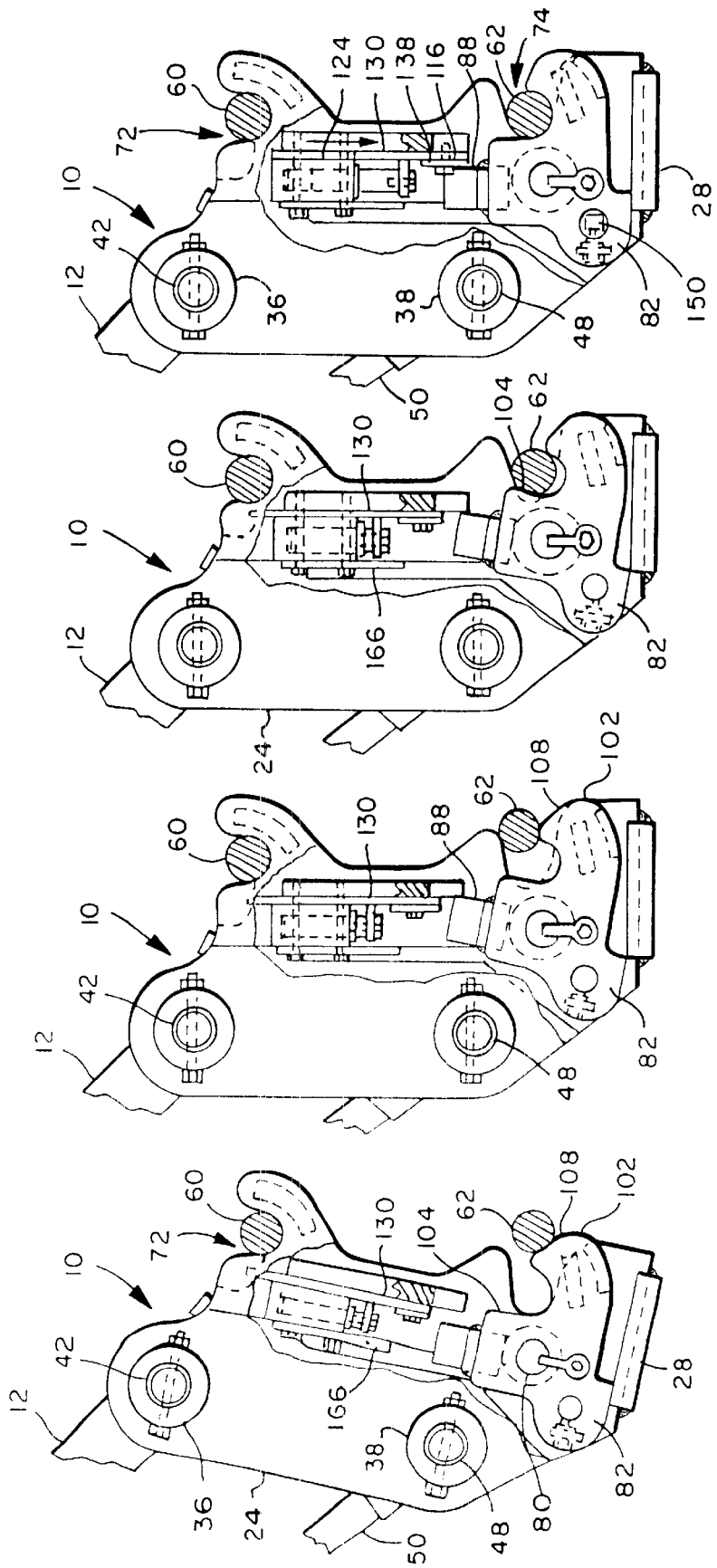

QUICK COUPLER FOR HEAVY EQUIPMENT

This patent application is a continuation of application Ser. No. 09/049,179 filed on Mar. 27, 1998, now abandoned and incorporated herein by reference.

BACKGROUND OF THE INVENTION

This invention relates to a connector for attaching implements to mobile construction equipment and the like and more particularly to a quick coupler allowing convenient interchangeability of implements on construction equipment.

Heavy equipment is used at construction sites, scrap yards, in roadwork, railroad maintenance, mines, at demolition sites, and elsewhere. Such equipment includes smaller tractors with backhoes, large excavators and other pieces of equipment. Often, excavators and backhoes have a boom attached to the body of the piece of equipment and a stick attached to the end of the boom. An implement such as a digging bucket, an impact hammer, an earth compactor, or another piece of equipment is then attached at the end of the stick. The implement at the end of the stick is often attached by means of a hinge pin connected to the stick and the implement. Additionally, a hydraulic cylinder connected to the stick is also connected to the implement through a link by means of a link pin. This allows the operator of the equipment to position the implement with the boom and stick and also rotate the implement about the end of the stick by means of the stick hydraulic cylinder.

A particular piece of construction equipment may be put to several different uses at the same job site. It may be used with an impact hammer to break-up concrete or rocks. At a different time at the same site, it will be used with a bucket to excavate a trench. Thereafter, the same piece of equipment may be used with a compactor implement when the trench is refilled. In order to efficiently use this versatility, the changing of implements at the end of the stick should be a relatively quick operation. To this end, numerous quick coupler attachments have been provided in the past. Generally, such quick couplers are attached to the stick and stick cylinder link of the piece of equipment. Recesses are provided on the open face of the quick coupler which can engage pins on the implement to be attached. Hydraulic, spring and/or other mechanisms are then used to grasp the pins on the implement.

Such prior art quick couplers sometimes employ hydraulic cylinders to directly drive a closure member around a pin. Other prior art quick couplers use a heavy spring to drive a closure member around a pin. In some instances, the force on the implement in use acts directly against the force of the hydraulic cylinder or spring retaining the implement. Other units require extensive hand manipulation in moving or cocking engagement members. Sometimes such hand manipulations require a good deal of effort as construction equipment is heavy and the quick coupler must therefore be robust. Moreover, the forces applied on construction equipment are often very large also requiring robust connectors, springs or hydraulic cylinders. The construction, demolition, mining, and other environments in which such equipment are used are usually gritty, open to the elements and very hard on equipment.

SUMMARY OF THE INVENTION

In accordance with the present invention, there is provided a quick coupler which does not require heavy springs directly biasing a pin grasping member into a closed position or a hydraulic cylinder exerting a large closure force on a pin grasping member.

In accordance with the present invention, there is provided a quick coupler comprising recesses which engage the upper mounting pin on an implement, recesses which engage the lower mounting pin on an implement, a movable latch which is positioned by contact with the pins on the implement only and a gate fixing the latch in the closed position when attached to an implement.

Further in accordance with the invention, the recesses on the quick coupler comprise one set of U-shaped recesses with the opening of the U facing in the direction of the plane defined by the two pins on the implement and the second set of U-shaped recesses with the opening of the U facing perpendicular to the plane defined by the two pins on the implement with the latch engaging the pin in the second set of recesses.

Still further in accordance with the invention, the latch comprises a hook shaped surface with the short leg of the hook forming a closure portion and the long leg of the hook forming an engagement portion and a pin of the implement retained between the closure portion and engagement portion when the latch is in the closed portion.

Still further in accordance with the invention, the latch closure portion engages the lower mounting pin on the implement and the closure portion is shaped so that the lower mounting pin may push by the closure portion when entering the appropriate recess, contact the engagement portion and push the engagement portion until the latch reaches the closed position whereupon the gate can be engaged.

Still further in accordance with the present invention, the latch is rotatable about an axis and has a catch portion with a surface generally extending radially from the latch axis which catch surface engages the gate in the closed position.

Still further in accordance with the present invention, the quick coupler has a frame comprising two side walls with locking apertures coaxial in the side walls and a locking aperture through the latch which is coaxial with the frame locking apertures when the latch is in the closed position. A pin is provided for insertion through the locking apertures and a pin retention structure is provided on the latch fixing the locking pin in place.

Still further in accordance with the invention, a double acting hydraulic cylinder is attached to the gate moving the gate between the open and closed position under operator control.

It is the principal object of the present invention to provide a quick coupler which is robust, reliable, easy to use, and inexpensive to manufacture.

It is another object of the present invention to provide a quick coupler in which a latch is held in the closed position by reason of a robust piece of steel engaging against a second robust piece of steel.

It is yet another object of the present invention to provide a quick coupler in which a control hydraulic cylinder simply moves a gate element into or out of engaged position and does not oppose the force of disengagement.

It is still another object of the present invention to provide a quick coupler using a latch and gate engagement and also a locking pin engagement fixing the attach in the closed, engaged position.

It is yet another object of the present invention to provide a quick coupler which does not require manual cocking of a mechanism into the open position to make it ready for attachment to an implement.

It is still another object of the present invention to provide a quick coupler in which an implement can be engaged, and a gate moved into the closed position from the excavator control station whereupon locking apertures will be aligned with a locking pin easily inserted and fixed in place completing the attachment.

It is yet another object of the present invention to provide a quick coupler which is easily maintained in the field, robust, not prone to failure, and having only a minimum of moving parts.

BRIEF DESCRIPTION OF THE DRAWINGS

The foregoing objects, and others, will in part be obvious and in part pointed out more fully hereinafter in conjunction with the written description of the preferred embodiment of the invention illustrated in the accompanying drawings in which:

FIG. 4 shows the quick coupler on FIGS. 1–3 as it begins to engage the mounting pins of an implement;

FIG. 5 is a view similar to FIG. 4 with the quick coupler more advanced in the engagement process;

FIG. 6 is a view similar to FIG. 5 with the engagement process still more advanced;

FIG. 7 is a view similar to FIG. 6 with the quick coupler in the completely engaged position;

DESCRIPTION OF THE PREFERRED EMBODIMENT

Figure 1:
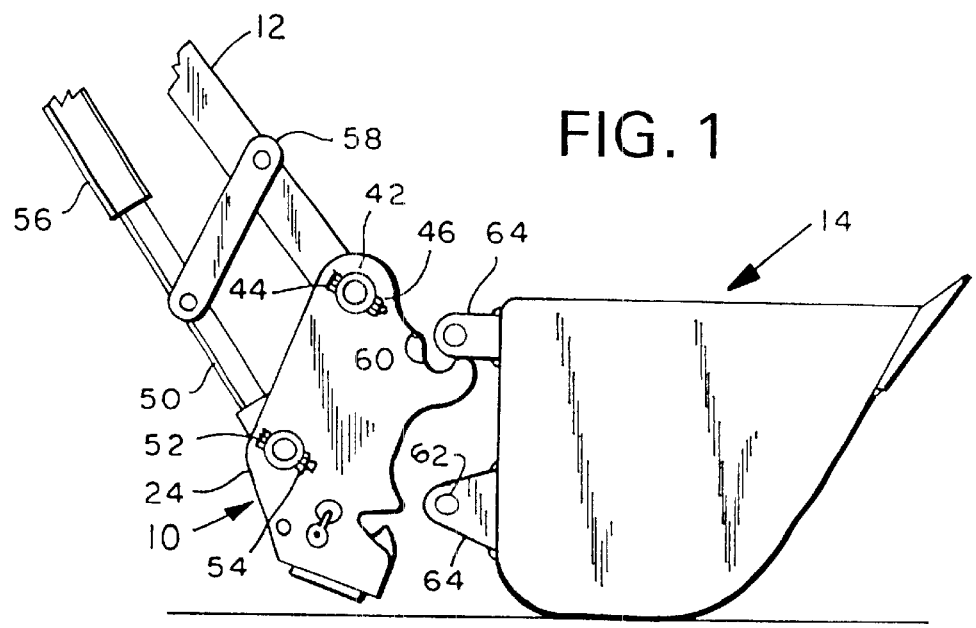
FIG. 1 is a side elevation of a quick coupler in accordance with the present invention, an excavator stick, stick cylinder and bucket.

Referring now in greater detail to the drawings, wherein the showings are for the purpose of illustrating a preferred embodiment of the invention and not for the purpose of limiting the invention. FIG. 1 shows a quick coupler 10 in accordance with the present invention fixed to the stick 12 of an excavating machine. An excavating bucket 14 is adjacent to the quick coupler 10. The quick coupler 10 is shown in more detail in FIGS. 2 and 3.

Figure 3:
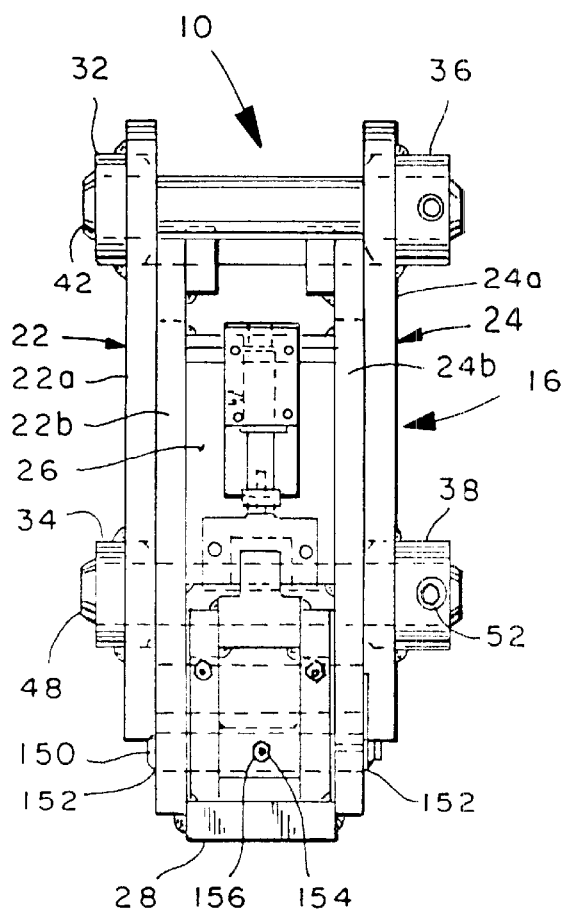
FIG. 3 is a front elevation of the quick coupler in accordance with the present invention as seen from the excavator side.
Figure 2:
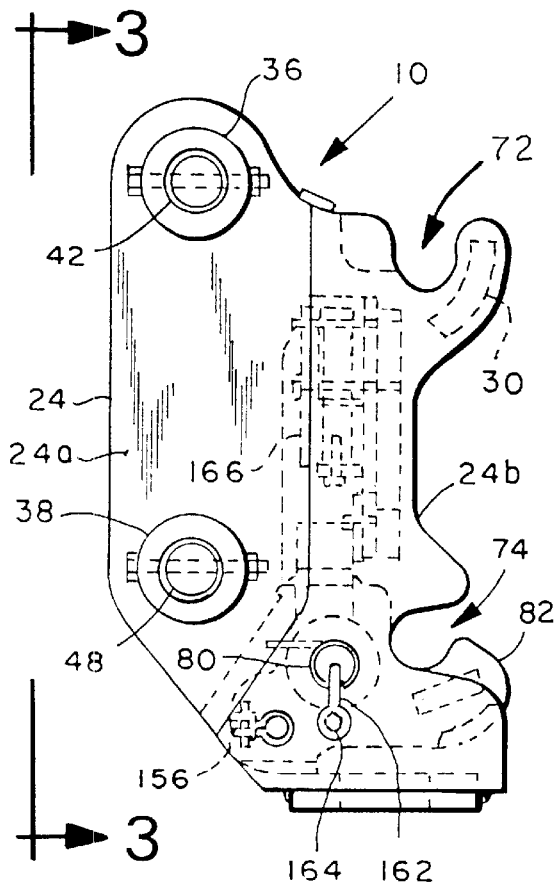
FIG. 2 is a more detailed side elevation of the quick coupler in accordance with the present invention.

The quick coupler 10 has a frame 16 comprising a two piece left side plate 22, a two piece right side plate 24, a central cross brace 26, a nose plate 28, and an upper cross brace 30. As can be seen in FIGS. 2 and 3, the side plates 22, 24 are fabricated from outer side plates 22a, 24a and inner side plates 22b, 22b. The inner side plates 22b, 22b are welded to the inside surface of the outer side plates 22a, 24a. The spacing between the inner surfaces of the outer side plates 22a, 24a is appropriate for accepting the stick 12 of an excavator. The spacing between the outer surfaces of the inner side plates 22b, 22b is approximately the same as the spacing between the inner surfaces of the outer side plates 22a, 24a. This spacing is therefore appropriate for engaging implements, such as bucket 14, normally engaged by the stick 12. Shims (not shown) may be used at the welds between the outer side plates and inner side plates to adjust spacing and provide clearance. The left side plate 22 and the right side plate 24 are fabricated from steel plate and have the same general outline. The central cross brace 26, the nose plate 28 and the upper cross brace 30 are all welded between the two side plates 22, 24. The side plates are thus rigidly interconnected.

The left side plate 22 is provided with a hinge bushing 32 and link bushing 34. The right side plate 24 is provided with a hinge bushing 36 and a link bushing 38. The two hinge bushings 32, 36 are coaxially aligned and the two link bushings 34, 38 are also coaxially aligned. A hinge pin 42 passes through the lefthand hinge bushing 32, lefthand plate 22, the excavator stick 12, the right-hand plate 24, and the right-hand hinge bushing 36. A bolt 44 and nut 46 are fixed through the right side hinge bushing 36 and the hinge pin 42 fixing it in place and fixing the quick coupler 10 to the stick 12. In a similar manner, a link pin 48 passes through bushings 34, 38 and side plates 22, 24 and excavator mounting link 50. The hinge pin 42 is held in place by a bolt 52 and nut 54 passing through the right side link bushing 38. A hydraulic cylinder 56 (the bucket cylinder) is fixed to the boom end of the stick 12 and to the excavator mounting link 50. A pair of brace links 58 are fixed to the stick 12 and to the mounting link 50. The bucket cylinder 56 can rotate the quick coupler 10 about the axis of the hinge pin 42 and can thus control the positioning of any implement attached to the quick coupler 10.

The nose plate 28 is a thick piece of steel plate interconnecting the bottom of the two inner side plates 22b, 22b and also providing a rest upon which the quick coupler can stand when not in use. The cross brace 30 rigidly interconnects the upper end of the inner side plates 22b, 22b. The central cross brace 26 rigidly interconnects the central portions of the side plates 22b, 22b, provides a mounting area for other elements to quick coupler and performs other functions described hereinafter. As can be seen in FIG. 1, the bucket 14 is provided with an upper mounting pin 60 and a lower mounting pin 62. The mounting pins 60, 62 are fixed to tabs 64 fixed to the bucket 14 by welding or the like. The pins 60, 62 and the tabs 64 are conventionally provided on virtually all implements to be used with an excavator. When a quick coupler is not used, the pins 60, 62 are mounted directly to the stick 12 and the link 50 with hinge and link pins. Thus, the bucket 14 and other implements do not need to be modified in any way for use with the quick coupler 10.

The mounting pins 60, 62 are generally parallel with one another. In the bucket 14 shown in FIG. 1, the pins 60, 62 are generally disposed with the upper pin 60 above the lower pin 62. A plane through the two pins 60, 62 is generally vertical. Other implements for use with this particular excavator and quick coupler will have pins of generally to the same diameter as the pins 60, 62 and spaced from one another the same distance as the pins 60, 62. The orientation of the pins may be different in that they may be horizontally disposed with respect to one another in the resting position but in all events, the two pins will define a mounting plane in which the axis of the two pins always resides.

As can be seen in FIG. 2, the side plates 22b, 22b are provided with upwardly opening U-shaped upper recesses 72. The two side plates 22b, 22b are also provided with laterally opening U-shaped lower recesses 74.

Figure 8:
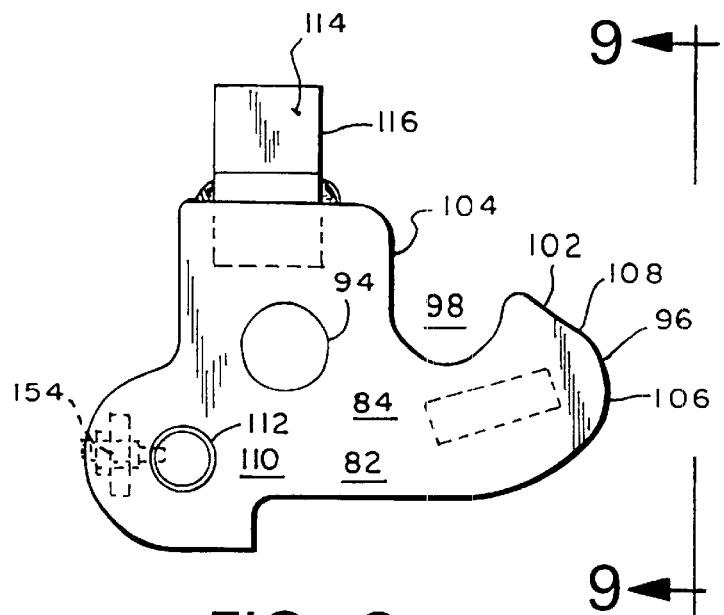
FIG. 8 is a side elevation of the latch element of the quick coupler of the present invention.
Figure 9:
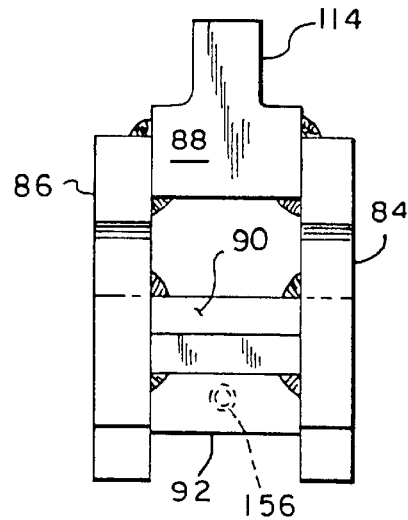
FIG. 9 is a front elevation of the latch element seen in FIG. 8.

A latch pivot pin 80 passes through apertures in the side plates 22a, 24a. The latch pivot pin is behind the lower recesses 74. The latch pivot pin 80 is slightly lower than the center of the lower recess 74. A latch 82, that is shown in detail in FIGS. 8 and 9, is rotatable about the latch pivot pin 80. As can be seen in FIGS. 2 and 3, the latch 82 is supported between the inner side plates 22b, 22b on the latch pivot pin 80. The latch comprises a right side latch plate 84, a left side latch plate 86, a catch 88, a brace 90, and a plunger mount plate 92. The latch plates 84, 86 are identical to one another in outline and rigidly interconnected by the catch 88, the brace 90 and the plunger mount plate 92. Coaxial apertures 94 are provided near the center of the latch plates 84, 86 and accommodate the latch pivot pin 80. The preferred latch 82 is welded from several components. The latch 82 could also be cast as a unit. The latch 82 has a forward portion (forward meaning in the direction toward the implement to be attached). The forward portion 96 is generally hook shaped with an upwardly facing recess 98. The forward portion 96 comprises a closure portion 102 and an engagement portion 104. The closure portion 102 is the most forward portion of the latch 82. Its forward edge 106 is flat or curved and the upper portion 108 of the forward edge slants upwardly and backwardly. The engagement portion 104 of the latch is closer to the latch pivot pin 80 than the closure portion 102. The engagement portion 104 is generally a vertical flat surface on the latch plates 84, 86 defining one side of the U-shaped recess 98. The term vertical is used with reference to the quick coupler 10 sitting on its nose plate 28.

The latch forward portion 96 thus is generally hook-shaped with a nose-like forward surface forming the forward side of an upwardly opening U-shaped recess 98. This profile is present on both the right side latch plate 84 and the left side latch plate 86. To the rear of the forward portion 96, the latch has a locking portion 110. The locking portion comprises portions of the latch plates 84, 86 having locking apertures 112 coaxially disposed through both plates. The plunger mount 92 rigidly interconnects the locking portions 110 of the latch plates 84, 86.

The catch 88 is a robust steel plate welded between the two latch plates 84, 86. The catch is shaped like an upside down "T." It is full width between the two side plates 84, 86 and has a tongue portion 114 of reduced width extending above the two latch plates 84, 86, that is, away from the latch pivot pin 80. Importantly, the catch 88 extends away from the latch pivot pin 80 and in a generally radial direction. The forward wall 116 of the catch tongue and the catch tongue 114 are generally radial with reference to the latch pivot pin 80 and hence the axis of rotation of the latch 82.

Figure 10:
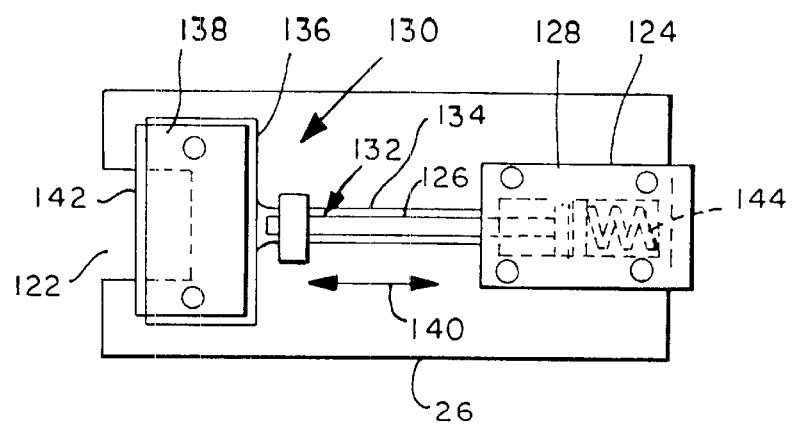
FIG. 10 shows the strike plate, gate and hydraulic cylinder of the quick coupler seen in FIGS. 1–9.

FIG. 10 shows the central cross brace 26 in more detail. The central cross brace 26 is welded rigidly between the two frame inner side plates 22b, 22b. It is generally rectangular and has a catch recess 122 in the center of its lower end. A double acting hydraulic cylinder 124 is bolted to the catch plate 26 on its centerline. A piston rod 126 extends from a piston 128 in the cylinder 124 and is fixed to a locking gate 130. The locking gate 130 comprises a T-shaped gate plate 132 having a long narrow stem 134 generally disposed parallel to the piston rod 126 and an enlarged gate head 136. The gate head is somewhat wider than the catch recess 122 and has a wear plate 138 bolted to it. Shims (not shown) can be inserted between the gate head 136 and the wear plate 138 as required. As can be seen in FIG. 10, the piston rod 126 moves the locking gate 130 in the direction of the arrow 140. This allows the cylinder 124 to either close the catch recess 122 with the gate head 136 or open the catch recess 122 by retracting the gate head toward the cylinder 124. When the piston rod 126 is retracted, the gate 130 is in the open position and the catch recess 122 is open. When the piston rod 126 is extended, the gate 130 is in the closed position and the catch recess 122 is closed.

The wear plate 138 has a chamfered forward edge 142.

A spring 144 in the cylinder 124 acts against the piston 128 biasing piston 128 and locking gate 130 into the closed position. If hydraulic pressure to the cylinder 124 is lost, the locking gate is held in the closed position. Retraction is avoided. The cylinder 124 can be replaced with an electrically operated controller such as a solenoid. The solenoid shaft would engage and operate the locking gate 130 as shown in FIG. 10. The solenoid would be spring biased into the closed position. An electrical signal would cause the solenoid shaft to retract, moving the gate 130 to the open position. The solenoid would be controlled by a switch at the excavator operator position.

The interaction of the latch 82, the gate 130, and the mounting pins 60, 62 is shown in FIGS. 4–7.

In FIGS. 4, 5 and 6, the locking gate 130 is shown in the open position. In FIG. 7, the locking gate 130 is shown in the closed position.

FIG. 1 shows the orientation of the quick coupler 10 as it approaches an implement to be connected to the arm 12. The operator of the excavator has positioned the quick coupler adjacent the bucket 14 and is about to engage the upper mounting pin 60 on the bucket 14 with the upper recesses 72 on the quick coupler 10. FIG. 4 shows the position just after the upper mounting pin 60 is fully engaged in the upper recess 72. The operator now extends the bucket cylinder 56 which rotates the quick coupler 10 about the hinge pin 42 and brings the upper portion 108 of the closure portion 102 of the latch 82 into contact with the lower mounting pin 62. The latch 82 is freely rotatable about the latch pin 80. As the bucket cylinder 56 is further extended, the quick coupler 10 assumes the position seen in FIG. 5. The pressure exerted by the lower mounting pin 62 against the upper portion 108 of the latch pushes the latch forward portion 96 downwardly causing the latch to rotate in a clockwise direction. The catch 88 rotates into the catch recess 122 of the central cross brace 26. The closure portion 102 of the latch 82 is thereby able to slide past the lower mounting pin 62.

As the lower end of the quick coupler 10 continues forward toward the bucket 14, the engagement portion 104 of the latch 82 engages the lower mounting pin 62. This causes the latch 82 to rotate in a counterclockwise direction about the latch pivot pin 80.

The bucket cylinder 56 continues its extension until the pin 62 is fully seated in the U-shaped lower recess 74. The lower pin 62 pushes the engagement portion 104 of the latch 82 into a vertical position, rotating the latch in a counterclockwise direction. The catch 88 is also rotated into a vertical position thereby, out of the space which is now available for the locking gate 130. The cylinder 124 is actuated by the operator bringing the gate into the closed position with the wear plate 138 bearing against the forward wall 116 of the catch 88. The sides of the gate head 136 bear against the central cross brace 26.

If the catch 88 is slightly out of position, the chamfered forward edge 142 of the wear plate 138 will engage the catch tongue forward wall 116 and push the catch 88 and latch 82 into the fully closed position. As can be seen in FIG. 7, the lower mounting pin 62 is secure in the lower recess 74. Because mounting pins 60, 62 are a fixed distance apart, the upper mounting pin 60 is also securely retained in the upper recess 72. The operator can now insert a locking pin 150 through locking apertures 152 in the inner side plates 22b, 22b and the latch locking apertures 112. A locking pin retaining screw or spring loaded plunger 154 retained in a threaded hole 156 in the plunger mounting plate 92 is then advanced into a recess in the locking pin 150. The implement 14 is thereby doubly locked to the quick attach 10 by action of the catch 88 against the gate head 136 and the locking pin 150.

When the locking gate 130 is in the open position, the latch 82 is freely rotatable within its range of motion. It is not spring biased or otherwise biased in a particular position. As shown in FIGS. 4–7, the movement and positioning of the latch 82 is governed simply by gravity and by the influence of the lower mounting pin 62 on shaped surfaces such as the upper portion 108 of the closure portion 102 and the engagement portion 104. These surfaces are shaped and spaced from the latch pivot pin to provide the movements seen in FIGS. 4–7 without the need for active biasing of the latch 82 in any way.

The latch pivot pin 80 is retained in place by means of a retainer 162 welded to the end of the pivot pin 80. The retainer is provided with a bolt hole through which a bolt 164 is passed and fastened to the right side plate 24 upper frame 16.

A cylinder guard 166 comprising a rectangular piece of steel plate is bolted over the hydraulic cylinder 124 to protect it.

Grease fittings, wear plate shims and the like are provided as required.

In the preferred embodiment, the upper U-shaped recesses 72 have openings facing upwardly. Such openings could face downwardly and still properly coact with the laterally opening lower recesses. In such an arrangement, the quick coupler 10 will be brought into engagement with the implement 14 by bringing it downwardly so that the upper recesses engage the upper pin 60 from the top. Thereafter, the quick coupler 10 would be rotated about the hinge pin 42 and the operation seen in FIGS. 4–7 would occur just as described.

The upper and lower recesses could be interchanged. That is, the lower recess could open downwardly and the upper recess could open laterally and be closed by the latch. However, such an arrangement would probably be more difficult in a conventional excavator because the upwardly opening recess would be controlled by the cylinder 56 making attachment somewhat difficult.

The upper recess 72 could be replaced with a lateral recess identical to the lower recess 74. A second latch would then be required. In such an arrangement, mounting of an implement 14 would be accomplished by moving the quick coupler 10 laterally toward the implement until both pins were properly seated and then locking the gates.

The quick coupler 10 is constructed from substantial steel plate elements. In the preferred embodiment, the frame side plates 22, 24 and latch side plates 84, 86 are constructed from 1¼" steel plate. The strike plate 26 is constructed from 1" thick steel plate. The other elements are similarly robust. All of these elements are welded into a very rigid quick coupler 10 suitable for use with heavy construction equipment and the like.

While considerable emphasis has been placed herein on the structures of the preferred embodiment and the structural interrelationships between component parts thereof, it will be appreciated that many changes in the embodiment herein illustrated and described can be made without departing from the principles of the invention. Several such changes have been described above. More will occur to those skilled in the art. Accordingly, it is to be distinctly understood that the foregoing descriptive matter is to be interpreted merely illustrative of the present invention and not as a limitation.

Having thus described the invention, it is claimed:

1. A connector for attaching implements having mounting pins to mobile equipment having an arm; said connector comprising:

an attachment for fixing said connector to said arm;

at least one upwardly opening recess adapted to receive one of said implement mounting pins;

at least one laterally opening recess adapted to receive one of said implement mounting pins;

a latch rotatable about an axis parallel to said pins between a closed position and an open position, said latch having a closure portion adapted to at least partially close said laterally opening recess when said latch is in a closed position and allowing passage of said pin into said lateral recess when said latch is in an open position, said latch closure portion having an outer surface adapted to slidably engage said pin entering said lateral recess causing said latch to rotate toward said open position, said latch having an engagement portion adapted to be contacted by said pin entering said lateral recess and pushed by said pin whereby said pin pushes said latch into a closed position, said latch being unrestrained when in said open position;

a gate moveable from an open position to a closed position, said gate engaging said latch when said gate and said latch are in said closed positions whereby said gate holds said latch in said closed position, said gate being disengaged from said latch when said gate is in said open position and said implement mounting pin is received in said laterally opening recess; and, a controller adapted to be actuated from a location remote from said connector selectively moving said gate between said open and said closed position.

2. The connector of claim 1, wherein said latch closure portion and engagement portion together are hook-shaped.

3. The connector of claim 1, wherein said latch has a locking aperture through said latch parallel to said latch axis and said connector has at least one locking aperture aligned with said latch locking aperture when said latch is in said closed position, and a locking pin adapted to pass through said locking apertures when said latch is in said closed position.

4. A connector for attaching implements having mounting pins to mobile equipment having an arm; said connector comprising:

an attachment for fixing said connector to said arm;

at least one upwardly opening recess adapted to receive one of said implement mounting pins;

at least one laterally opening recess adapted to receive one of said implement mounting pins;

a latch rotatable about an axis parallel to said pins between a closed position and an open position, said latch having a closure portion adapted to at least partially close said laterally opening recess when said latch is in a closed position and allowing passage of a pin into said lateral recess when said latch is in an open position, said latch having an engagement portion adapted to be contacted by a pin entering said lateral recess and pushed by said pin whereby said pin pushes said latch into a closed position, said latch having a locking aperture through said latch parallel to said latch axis and said connector has at least one locking aperture aligned with said latch locking aperture when said latch is in said closed position, and a locking pin adapted to pass through said locking apertures when said latch is in said closed position, said pin having two ends, a cylindrical side wall and an aperture in said cylindrical side wall and said connector having a plunger adapted to engage said pin aperture, locking said pin in place;

a gate moveable from an open position to a closed position, said gate engaging said latch when said gate and said latch are in said closed positions whereby said gate holds said latch in said closed position; and, a controller selectively moving said gate between said open and said closed position.

5. The connector of claim 1, wherein said latch includes a catch extending substantially radially away from the axis of said latch, said catch being engaged by said gate.

6. The connector of claim 5, wherein said catch has a substantially planar lateral surface adapted to engage said gate.

7. The connector of claim 6, wherein said gate has a substantially planar surface adapted to engage said catch.

8. The connector of claim 1, wherein said controller is a hydraulic cylinder.

9. The connector of claim 8, wherein said controller is a double acting hydraulic cylinder.

10. The connector of claim 8, wherein said controller includes a spring biasing said gate toward said closed position.

11. A connector for attaching implements having a first mounting pin and a second mounting pin to mobile equipment having an arm, said connector comprising:

a frame comprising two side walls, said frame adapted to be fixed to said mobile equipment arm;

a first pair of coaxial recesses adapted to receive said first implement mounting pin, said first pair of recesses comprising arecess in each said side wall;

a second pair of coaxial recesses adapted to receive said second implement mounting pin, said second pair of recesses comprising a recess in each of said side walls;

a rigid latch moveable between a closed position and an open position, said latch being unrestrained when in said open position;

said latch having a closure portion adapted to at least partially enclose said second mounting pin in said closed position, said latch closure portion having an outer surface which slants toward an opening in said latch allowing passage of said pin past said closure portion and into engagement with said engagement portion by said pin displacing said latch, said second pair of recesses and said latch together engaging said second pin around at least half its circumference;

said latch having an engagement portion adapted to be contacted by said second mounting pin in said recess;

said latch having a catch portion;

a gate moveable between an open position and a closed position, said gate engaging said catch portion and preventing movement of said latch to said open position when said gate is in said closed position and said latch is in said closed position, said gate being disengaged from said latch when said gate is in said open position and said second implement mounting pin is received in said second pair of recesses, and said gate being controlled from a location remote from said connector.

12. The connector of claim 11, wherein said first mounting pin has a first axis and said second mounting pin has a second axis parallel to said first axis and said axes define a plane, said first pair of recesses having openings facing more closely to in said plane than perpendicular to said plane.

13. The connector of claim 12, wherein said recesses are U-shaped.

14. The connector of claim 11, wherein said latch closure portion and engagement portion together are hook-shaped.

15. The connector of claim 11, wherein said latch has a locking aperture through said latch and said frame sidewalls have locking apertures coaxial with said latch locking aperture when said latch is in said closed position and said connector further comprises a locking means adapted to be retained in said locking apertures when said latch is in said closed position.

16. A connector for attaching implements having a first mounting pin and a second mounting pin to mobile equipment having an arm, said connector comprising:

a frame comprising two side walls, said frame adapted to be fixed to said mobile equipment arm;

a first pair of coaxial recesses adapted to receive said first implement mounting pin, said first pair of recesses comprising a recess in each said side wall;

a second pair of coaxial recesses adapted to receive said second implement mounting pin, said second pair of recesses comprising a recess in each of said side walls;

a rigid latch moveable between a closed position and an open position;

said latch having a closure portion adapted to at least partially enclosed said second mounting pin in said closed position, said second pair of recesses and said latch together engaging said second pin around at least half its circumference;

said latch having an engagement portion adapted to be contacted by said second mounting pin in said recess;

said latch having a catch portion;

said latch having a locking aperture through said latch and said frame sidewalls have locking apertures coaxial with said latch locking aperture when said latch is in said closed position and said connector further comprises a locking means adapted to be retained in said locking apertures when said latch is in said closed position, said locking means is a pin having two ends, a cylindrical side wall and an aperture in said cylindrical side wall and said connector has a plunger adapted to engage said pin aperture, locking said pin in place;

a gate moveable between an open position and a closed position, said gate engaging said catch portion and preventing movement of said latch to said open position when said gate is in said closed position and said latch is in said closed position.

17. The connector of claim 11, wherein said latch is rotatable about an axis and said catch extends substantially radially from said axis.

18. The connector of claim 17, wherein said catch has a substantially planar lateral surface adapted to engage said gate.

19. The connector of claim 18, wherein said gate has a substantially planar surface adapted to engage said catch.

20. The connector of claim 11, wherein said gate is moved from said open position to said closed position by operation of a hydraulic cylinder.

21. The connector of claim 20, wherein said hydraulic cylinder is a double acting hydraulic cylinder.

22. A connector for attaching an implement to mobile equipment having an arm, said implement having a pair of mounting pins, said mounting pins having axes generally parallel to one another in a mounting plane, said connector comprising:

an attachment for fixing said connector to said arm;

at least one first recess having an opening facing in a direction generally parallel to said mounting plane adapted to receive one of said implement mounting pins;

at least one second recess having an opening facing in a direction generally perpendicular to said mounting plane adapted to receive one of said implement mounting pins;

a latch rotatable about an axis parallel to said pins having an open position and a closed position, said latch having a closure portion adapted to grasp said mounting pin in said second recess when said latch is in said closed position, said latch closure portion has an outer surface adapted to slidably engage said pin entering said lateral recess causing said latch to rotate toward said open position, said latch having an engagement portion adapted to move said latch into said closed position by displacement due in part to contact with said mounting pin when said mounting pin is fully seated in said second recess, said latch having a catch, and said latch being unrestrained when in said open position;

a gate on said connector having an open position out of contact with said catch and a closed position, said gate restraining said latch in said closed position by contact with said catch when said gate is in said closed position, said gate being out of contact with said catch when said gate is in said open position and said mounting pin is fully seated in said second recess; and, a controller moving said gate between said open position and said closed position adapted to be actuated from a location remote from said connector.

23. A connector for attaching an implement having a first and a second horizontally extending mounting pin to an arm and power cylinder of a piece of mobile equipment, said connector comprising:

a pair of spaced apart, vertically extending walls, each having a top, a bottom, a front, a back, an outside surface, and an inside surface with each of said inside surfaces facing one another, co-axially extending through each of said walls is an upper opening and a lower opening for respectively receiving a hinge pin from the arm and the power cylinder of the piece of mobile equipment, said upper openings being adjacent said top and said back of said walls, and said lower openings being generally vertically spaced away from said upper openings toward said bottom of said walls;

a plurality of cross-members rigidly extending between said walls including at least one bottom cross-member extending between said walls adjacent said bottom thereof, and at least one central cross-member extending between said inside surfaces of said walls;

a first pair of co-axial recesses adapted to receive the first horizontally extending mounting pin of the implement, said first pair of recesses comprising a recess in each of said walls opening toward said tops thereof;

a second pair of co-axial recesses adapted to receive the second horizontally extending mounting pin of the implement, said second pair of recesses comprising a recess in each of said wall opening toward said front thereof;

a rigid latch rotatably about an axis parallel to the mounting pins, and supported on said walls between said inside surfaces thereof adjacent said second pair of co-axial recesses, said latch being moveable between an opened and a closed position, and having a closure portion, an engagement portion, a recess portion between said closure and said engagement portions, and a catch, said recess portion of said latch being co-axial with said second pair of recesses when said latch is in said closed position, said closure portion being adapted to at least partially enclose the second horizontally extending mounting pin of the implement and having an inclined outer surface extending toward said recess portion, said outer surface being positioned adjacent said second pair of co-axial recesses such that said outer surface slidably engages the second mounting pin of the implement causing displacement of said latch from said closed to said open position and allowing passage of the second mounting pin into said second pair of co-axial recesses;

a gate mechanism having a gate moveable between an engaged and a disengaged position, a controller for moving said gate between said engaged and said disengaged positions, said controller having an output shaft attached to said gate, said controller being supported on one of said at least one central cross-members, said gate being slidably supported adjacent said controller on said cross-member, said gate being adapted to engage said catch portion of said latch when said latch is in said closed position and said gate is in said extended position, and said latch being unrestrained and moveable between said open and closed positions when said gate is disengaged from said catch portion; and, a switch remotely positioned from said connector for activating said controller to move said gate between said engaged and said disengaged positions.

24. The connector of claim 23 being further comprised of a locking pin extending between said latch and at least one of said walls preventing relative movement therebetween, said latch having a locking pin aperture adapted to receive said locking pin, and said at least one of said walls having a complementary locking pin aperture positioned such that said apertures are co-axial when said latch is in said closed position.

25. The connector of claim 23, wherein said latch is comprised of a latch member extending between said spaced apart walls, and a latch pin rotatably supporting said latch member on said spaced apart walls.

26. The connector of claim 25, wherein said latch member is comprised of a pair of spaced apart latch plates, and a plurality of cross-members rigidly extending between said latch plates.

27. The connector of claim 26, wherein said catch is one of said plurality of cross-members, and said catch extends from said latch member generally radially away from said latch pin.

28. The connector of claim 26 being further comprised of a locking pin extending between said latch member and at least one of said walls preventing relative movement therebetween, said latch member having a locking pin aperture adapted to receive said locking pin, and said at least one of said walls having a complementary locking pin aperture positioned such that said apertures are co-axial when said latch is in said closed position.

29. The connector of claim 28, wherein said locking pin has an axis, two opposing ends, an outer wall, and a detent extending into said outer wall positioned between said ends, and said connector having retaining means supported on one of said plurality of cross-members adjacent said detent in said locking pin, said retaining means engaging said locking pin and preventing axial displacement thereof.

30. The connector of claim 29, wherein said retaining means is a spring plunger.

31. A latch for use on a connector to couple an implement and a piece of mobile equipment having an arm and a power cylinder, the implement having a first mounting pin and a second mounting pin, the connector including a frame adapted to be supported on the arm and the power cylinder, the frame having a pair of spaced apart walls, at least one recess on the frame adapted to receive the first pin, at least one recess on the frame adapted to receive the second pin, and, a gate supported on the frame moveable between an extended and a retracted position, said latch comprising:

a latch member comprised of a pair of spaced apart latch plates, and a plurality of cross-members rigidly extending between said latch plates, said latch member extending between the spaced apart walls;

a latch pin rotatably supporting said latch member on the frame adjacent the at least one recess on the frame adapted to receive the second pin; and, a catch supported on said latch member and extending from said latch member generally radially away from said latch pin;

said latch member having a recess portion, an engagement portion adjacent said recess portion, and a closure portion adjacent said recess portion opposite said engagement portion;

said closure portion being adapted to at least partially enclose the second mounting pin of the implement and having an inclined outer surface extending toward said recess portion such that said outer surface slidably engages the second pin of the implement.

32. The latch of claim 31, wherein said catch is one of said plurality of cross members.

33. A connector for attaching implements having a first mounting pin and a second mounting pin to mobile equipment having an arm and a power cylinder, said connector comprising:

a frame comprising two side walls, said frame adapted to be fixed to said mobile equipment on said arm and said power cylinder;

a first pair of coaxial recesses adapted to receive said first implement mounting pin, said first pair of recesses comprising a recess in each said side wall;

a second pair of coaxial recesses adapted to receive said second implement mounting pin, said second pair of recesses comprising a recess in each of said side walls;

a rigid latch moveable between a closed position and an open position, said latch being unrestrained when in said open position;

said latch having a catch portion;

a gate moveable between an open position and a closed position, said gate engaging said catch portion and preventing movement of said latch to said open position when said gate is in said closed position and said latch is in said closed position, said gate being disengaged from said latch when said gate is in said open position and said second implement mounting pin is received in said second pair of recesses, and said gate being controlled from a location remote from said connector;

said latch having a closure portion adapted to at least partially enclosed said second mounting pin in said closed position, said second pair of recesses and said latch together engaging said second pin around at least half its circumference;

said latch having an engagement portion adapted to be contacted by said second mounting pin in said recess; and, said latch having a locking aperture through said latch and said frame sidewalls have locking apertures coaxial with said latch locking aperture when said latch is in said closed position and said connector further comprises a locking means adapted to be retained in said locking apertures when said latch is in said closed position.

34. The connector of claim 33, wherein said first mounting pin has a first axis and said second mounting pin has a second axis parallel to said first axis and said axes define a plane, said first pair of recesses having openings facing more closely to in said plane than perpendicular to said plane.

35. The connector of claim 34, wherein said recesses are U-shaped.

36. A connector for attaching implements having a first mounting pin and a second mounting pin to mobile equipment having an arm and a power cylinder, said connector comprising:

a frame comprising two side walls, said frame adapted to be fixed to said mobile equipment on said arm and said power cylinder;

a first pair of coaxial recesses adapted to receive said first implement mounting pin, said first pair of recesses comprising a recess in each said side wall;

a second pair of coaxial recesses adapted to receive said second implement mounting pin, said second pair of recesses comprising a recess in each of said side walls;

a rigid latch moveable between a closed position and an open position, said latch being unrestrained when in said open position;

said latch having a catch portion;

a gate moveable between an open position and a closed position, said gate engaging said catch portion and preventing movement of said latch to said open position when said gate is in said closed position and said latch is in said closed position, said gate being disengaged from said latch when said gate is in said open position and said second implement mounting pin is received in said second pair of recesses, and said gate being controlled from a location remote from said connector;

said latch having a closure portion adapted to at least partially enclosed said second mounting pin in said closed position, said second pair of recesses and said latch together engaging said second pin around at least half its circumference;

said latch having an engagement portion adapted to be contacted by said second mounting pin in said recess; and, said latch being rotatable about an axis and said catch extends substantially radially from said axis.

37. The connector of claim 36, wherein said catch has a substantially planar lateral surface adapted to engage said gate.

38. The connector of claim 37, wherein said gate has a substantially planar surface adapted to engage said catch.

39. A connector for attaching implements having a first mounting pin and a second mounting pin to mobile equipment having an arm and a power cylinder, said connector comprising:

a frame comprising two side walls, said frame adapted to be fixed to said mobile equipment on said arm and said power cylinder;

a first pair of coaxial recesses adapted to receive said first implement mounting pin, said first pair of recesses comprising a recess in each said side wall;

a second pair of coaxial recesses adapted to receive said second implement mounting pin, said second pair of recesses comprising a recess in each of said side walls;

a rigid latch moveable between a closed position and an open position, said latch being unrestrained when in said open position;

said latch having a catch portion;

a gate moveable between an open position and a closed position, said gate engaging said catch portion and preventing movement of said latch to said open position when said gate is in said closed position and said latch is in said closed position, said gate being disengaged from said latch when said gate is in said open position and said second implement mounting pin is received in said second pair of recesses, and said gate being controlled from a location remote from said connector;

said latch having a closure portion adapted to at least partially enclosed said second mounting pin in said closed position, said second pair of recesses and said latch together engaging said second pin around at least half its circumference;

said latch having an engagement portion adapted to be contacted by said second mounting pin in said recess; and, said gate being moveable from said open position to said closed position by operation of a hydraulic cylinder.

40. The connector of claim 39, wherein said hydraulic cylinder is a double acting hydraulic cylinder.

\* \* \* \* \*